United States Patent [19]
Wolfe et al.

[11] Patent Number: 5,716,425
[45] Date of Patent: Feb. 10, 1998

[54] CONTROL SYSTEM FOR GLASS BENDING PLATEN

[75] Inventors: Jennifer R. Wolfe, Curtis; Allan T. Enk; Robert G. Revells, both of Toledo; Gary A. Smith, Perrysburg, all of Ohio

[73] Assignee: Libbey-Owens-Ford Co., Toledo, Ohio

[21] Appl. No.: 398,379

[22] Filed: Mar. 3, 1995

Related U.S. Application Data

[63] Continuation-in-part of Ser. No. 228,121, Apr. 15, 1994, abandoned.

[51] Int. Cl.$^6$ .......................... C03B 23/023; C03B 23/03
[52] U.S. Cl. .......................... 65/106; 65/29.1; 65/29.11; 65/29.12; 65/29.15; 65/29.18; 65/160; 65/163; 65/273; 65/287; 65/DIG. 13
[58] Field of Search .................. 65/29.1, 29.11, 65/29.12, 29.15, 29.18, 106, 160, 163, 273, 287, DIG. 13

[56] References Cited

U.S. PATENT DOCUMENTS 4,496,386  1/1985  Hymore et al. .......................... 65/106
5,178,660  1/1993  Wampler et al. ......................... 65/273

*Primary Examiner*—Donald E. Czaja
*Assistant Examiner*—Michael P. Colaianni
*Attorney, Agent, or Firm*—Marshall & Melhorn

[57] ABSTRACT

A closed loop control system for a hydraulically actuated glass sheet press bending platen. Flow of fluid supplied to the cylinder operating the press platen is controlled through a servo solenoid valve. A linear motion transducer associated with the platen and sends appropriate signals to a programmable motion controller. The motion controller controls a position module operatively coupled to a servo solenoid valve which regulates the flow of hydraulic fluid from a pump to the cylinder. The motion controller utilizes data from the linear motion transducer for making necessary corrections to insure that the platen cycles precisely in accordance with a predetermined program. In a second embodiment of the invention, the closed loop control system for the hydraulically operated platen is combined with a precision control of a variable speed glass sheet conveyor means for improved registry of the glass sheet being bent with the platen member.

21 Claims, 5 Drawing Sheets

CONTROL SYSTEM FOR GLASS BENDING PLATEN

CROSS-REFERENCE TO RELATED APPLICATION

The present application is a continuation in part of United States Letters Patent application Ser. No. 08/228,121, filed Apr. 15, 1994 now abandoned in the names of Jennifer R. Wolfe, Allen T. Enk, and Robert G. Revells, and entitled "Control System for Glass Bending Platen." The specification of said application, to the extent not repeated herein, is specifically incorporated by reference.

BACKGROUND OF THE INVENTION

1. Field of the Invention

The present invention pertains broadly to press bending of glass sheets, and more particularly to a press bending device utilizing a hydraulically actuated platen incorporating a closed loop hydraulic control system.

2. Description of the Prior Art

Bent or curved glass sheets are commonly employed as glazing closures in present day vehicles such as automobiles and the like. Such glass sheets must be bent to precisely defined curvatures dictated by the configuration and size of the openings in the vehicle body in order to meet the strict quality standards of automobile manufacturers. In addition, the bent sheets must be of consistently high optical quality in accordance with established government and industry standards. Such curved glass sheets intended for use as automobile side and rear windows are generally thermally tempered to increase their resistance to damage due to impact and to cause the glass, if broken, to fragment into relatively small harmless particles as opposed to the large, jagged pieces normally resulting from the breaking of untempered glass. Alternatively, if the glass sheets are to be used in the production of automobile windshields, for example, the glass is subjected to a suitable annealing procedure following bending.

In accordance with a procedure currently widely used in producing such curved sheets of glass, flat sheets of glass are heated to their softening temperature, and the heat-softened sheets are then press bent to the desired curvature between complemental shaping surfaces. Following bending, the bent sheets may be rapidly cooled in a controlled manner to a temperature below the annealing range of glass for tempering purposes, or they may be gradually cooled in a controlled manner to a temperature below the annealing range for annealing the bent sheets. In either case the operations are preferably carried out in succession, while the sheets of glass are being advanced substantially continuously on a conveyor system along a horizontal path including, in succession, a heat area, a bending area and a tempering or annealing area. The heat initially imparted to each sheet to bring it to the proper bending temperature is thus also utilized in the final heat treating operation.

The complemental shaping surfaces between which the sheets are formed to the desired curvature are provided on opposed upper and lower press members or platens, normally located above and below the horizontal path of movement of the glass sheets on the conveyor system. The sheets are conveyed into position between the upper and lower press members, and the opposed press members are movable relatively toward and away from each other for pressing the sheets into the desired shape. A hydraulic cylinder of generally conventional construction is preferably employed for raising the lower press member upwardly to engage and lift a suitably positioned heated glass sheet from the conveyor system, out of the horizontal path, and press it against the complemental shaping surface of the opposed or upper press member. The cylinder then retracts the lower press member to deposit the bent sheet upon the conveyor system for advancement out of the bending area.

In production it is necessary that as the sheets are bent one after another they consistently achieve a uniform shape and be free of objectionable defects which might result from inconsistent operation of the press bender. The upper and lower press members may be frequently changed to produce sheets of different configurations, and it is desirable to minimize the time required to make the changeover and begin production of the different parts so as to minimize down time and lost production. The movement of the mold needs to be smooth and of controlled velocity from cycle to cycle to assure that the sheets are subjected to equivalent gravitational and pressing forces from cycle to cycle.

In the hydraulic system conventionally employed heretofore for operating the bending press, the hydraulic cylinder operatively coupled to the lower platen is incorporated in a so-called open loop system. The system may comprise a circuit including a pump connected to the cylinder through solenoid controlled "platen up" and "platen down" flow regulating valves, with a cam-and-plunger operated flow control valve in the upside of the circuit. To begin a pressing cycle a programmable controller sends a signal to the platen-up solenoid, and full hydraulic pressure is delivered to the platen cylinder. The upstroke speed is determined by the flow control valve in the platen-up circuit. It is important that the sheet not be moving at an excessive speed as it is pressed against the upper mold, and that the lower platen not be jolted by coming to an abrupt stop from high speed as it reaches its upmost position. To that end, at a selected point in the upstroke the cam operates the plunger on the flow reducing valve which, in turn, reduces the rate of flow of hydraulic fluid being delivered to the platen cylinder. The platen continues its upward movement at a reduced velocity until it reaches the end of the cylinder stroke.

When pressing has been completed the platen-down solenoid is energized by the programmable controller. This delivers full hydraulic pressure to the platen cylinder and the platen moves downwardly until it reaches a down-normal position on a programmable limit switch. The limit switch then sends a signal for the down solenoid to close. Once the solenoid is closed the platen tends to continue its downward movement for a brief period due to the hysteresis of the system, until it comes to rest at some position below the "down normal" position. This position is generally constant for a given temperature, and hence viscosity, of the hydraulic fluid, but may vary as the fluid temperature changes. The upper dwell position of the lower platen, that is, the upper limit of the stroke at which the sheet is pressed against the upper press member by the lower press member, is constant since this position is at the end of the platen cylinder stroke.

As the heated sheet advances into the bending station on the conveyor rolls, its forward edge is engaged by retractable stops which restrain the sheet in position to be lifted from the conveyor rolls by the lower press member. In order to minimize potential damage during the dwell time of the stopped sheet upon the spaced conveyor rolls, it is important that cycling of the lower press member be closely coordinated with movement of the sheet into position by the conveyor rolls. With the prior system the down or lower dwell position of the lower platen is subject to positioning variations due to errors of the programmable limit switch and changes in hydraulic oil temperature as pointed out above. In addition, adjustment of the various flow controls and the cam position are matters of subjective judgment and will vary from setup for production of one part to another, and even from one shift to another as an operator makes changes in accordance with his or her perception of the operation. These factors cause variations in the positioning of the lower platen in its lower, rest position, which result in undesirable variable dwell times of the glass on the rolls. A lower down position, of course, results in a longer dwell time while a higher down position results in a shorter dwell time.

SUMMARY OF THE INVENTION

The aforementioned problems of the prior art are addressed in accordance with the present invention by utilization of a closed loop hydraulic control system. Flow of hydraulic fluid supplied to the cylinder operating the lower platen is controlled through a servo solenoid valve. A linear displacement transducer associated with the lower press platen continuously monitors the position and velocity of the platen and sends appropriate signals indicative of the position and velocity to a programmable motion controller. The motion controller is programmed through an operator interface to cause the lower platen to cycle through a predetermined sequence in accordance with the motion control program. To that end the motion controller commands a position module which is operatively coupled to the spool of the servo solenoid valve. The servo solenoid valve in turn regulates the flow of hydraulic fluid from a hydraulic pump to the hydraulic cylinder or actuator. The linear displacement transducer feeds lower platen position and velocity information to the programmable motion controller, which utilizes the information for making any necessary corrections to insure that the platen and lower press member thereon cycle in accordance with the predetermined program.

Figure 1:
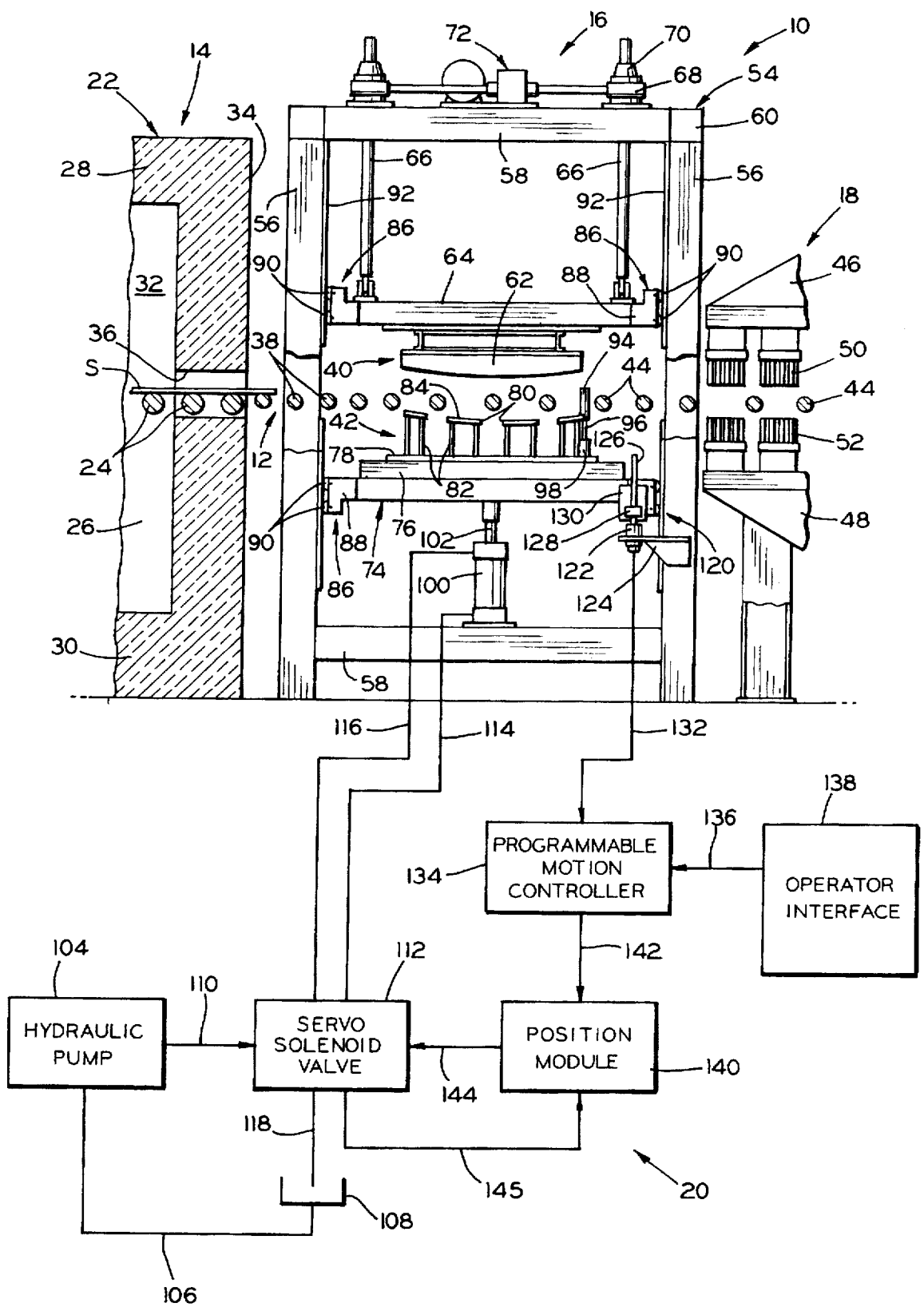
FIG. 1 is a fragmentary side elevational view of a bending and tempering apparatus embodying the invention, and schematically illustrating the hydraulic control system.

It is to be understood that the invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Referring now in detail to the illustrative embodiment depicted in the accompanying drawing, there is shown generally at 10 a bending and tempering apparatus for producing bent and tempered glass sheets by a generally continuous process. Glass sheets to be bent are advanced along a predetermined path successively through a heating area, a bending area and a thermal conditioning area, with the areas being contiguous so that a sheet passes immediately from one area to the next succeeding area. To that end the apparatus 10 includes a conveyor system 12 adapted to support a series of sheets S for movement one after another along a predetermined horizontal path through a heating section 14, a bending station 16 and a thermal conditioning station 18, in this case a tempering section. The sections 14, 16 and 18 are disposed end-to-end along the path so that residual heat remaining in the sheets following bending may be utilized for thermal conditioning purposes. A programmable operating system, shown schematically at 20, is provided for the bending station.

While the invention has been illustrated in conjunction with a tempering section adjacent the bending station 16, it will be appreciated that it may as well be utilized with an annealing section in place of the tempering section as the thermal conditioning station 18 where annealed bent sheets are to be produced.

Typically, the glass sheets S are heated in a controlled manner while being conveyed through a furnace 22 comprising the heating section 14 on aligned conveyor rolls 24 forming part of the conveyor system 12. The furnace may be of any suitable construction and conventionally, as illustrated, may be a tunnel-type furnace having a heating chamber 26 defined by a roof 28, a bottom wall or floor 30, opposite side walls 32 and an end wall 34. The heating chamber 26 is heated by suitable heating means such as gas burners or electrical resistance heaters (not shown) disposed in the top, bottom and side walls and suitably regulated to provide a desired heating pattern for the glass sheets moving therethrough. The sheets' are carried through the heating chamber 26 on the conveyor rolls 24 of the conveyor system 12, which extend from the entrance end (not shown) of the furnace through an opening 36 in the end wall 34. The sheets are heated to substantially their softening point as they are conveyed through the controlled temperature environment of the furnace. Upon exiting the furnace through the opening 36, the heated sheets are received upon a second series of conveyor rolls 38 for movement into and within the bending station 16. The heated sheets are conveyed upon the rolls 38 between opposed upper and lower press members 40 and 42, respectively, which impart the desired curvature thereto as will be hereinafter described.

Following bending the sheets are advanced along the conveyor 12 on a further series of rolls 44 through the adjacent thermal conditioning station 18. While the rolls 38 and 44 have been illustrated as being of linear or straight configuration, it is contemplated that they may as well be of the curved mandrel and rotating sleeve type conventionally employed in conveying bent sheets as disclosed, for example, in U.S. Pat. Nos. 4,015,968 and 4,167,997. In the tempering station the bent glass sheets pass between upper and lower blastheads 46 and 48, respectively. The blastheads have a plurality of tubes 50 and 52 operably disposed to direct opposed streams of cooling fluid, generally air or the like, towards and against the opposite surfaces of the sheets moving along the conveyor.

The press bending station 16 more particularly comprises a skeletal framework 54 generally of rectangular parallel piped form. The framework includes upstanding corner posts 56 interconnected at their top and bottom by longitudinal beams 58 and transverse beams 60. The rolls 38 and 44 of the bending station are drivingly mounted upon the framework in a conventional manner (not shown). Upper and lower press members 40 and 42, respectively, are mounted within the framework 54 for reciprocating relative movement toward and away from each other. The press members are provided with opposed complemental shaping members conforming to the curvature to which the sheets are to be bent.

The upper or male press member 40 typically comprises a shaping element 62 carried upon a platen frame 64. While not limited thereto the upper male shaping element as illustrated is of the so-called solid or continuous type, and includes a continuous glass contacting surface having a configuration complementary to that of the lower female shaping rail of the lower press member 42. The platen frame is preferably constructed to be adjustable to selected vertical positions in order to accommodate glass parts bent to varying degrees of curvature between the opposed press members. To that end the platen frame 64 is operatively coupled at each of its corners within the framework 54 to the lower ends of screw jack shafts 66. The jack shafts are threadably received within rotatable collars 68 of screw jack bases 70 carried on a framework comprised by the beams 58 and 60 atop the framework 54. Also carried atop the framework is a motorized drive unit 72 adapted to rotatably drive the collars 68 in unison for retracting or extending the shafts 66 to correspondingly raise or lower the platen frame 64 and the shaping element 62 carried thereby.

The lower or female press member 42 is mounted for vertical reciprocating movement upon each bending cycle, that is, as each glass sheet is lifted from the rollers 38 and pressed against the upper shaping element 62. To that end the press member 42 comprises a carriage, identified generally at 74, including a bed 76 upon which a base plate 78 is mounted. A shaping rail 80 is mounted upon and spaced from the base plate by means of connecting rods 82. The shaping rail as illustrated is of the so-called peripheral ring-type, conforming in outline to the glass sheets S to be bent, and is formed to include a series of spaced segments across its ends so as to be able to pass upwardly between the rollers 38 and lift a sheet from the conveyor. Of course, the rollers may as well be of other well-known configurations such as the curved rollers of U.S. Pat. No. 5,178,660 which curve downwardly beneath the ends of the shaping rail so that the shaping rail may be a continuous ring. Also, as will be readily appreciated a shuttle transfer mechanism (not shown) such as disclosed and described in U.S. Pat. No. 4,883,526 may be incorporated in the bending and thermal conditioning apparatus for receiving and transferring the bent sheets.

The shaping rail 80 is provided on its upwardly directed face with a generally concave shaping surface 84 complementary to the shaping surface of the upper shaping element 62 in opposed relationship thereto. In order to insure that the platen frame 64 and the carriage 74 move freely up and down along a precise vertical path within the framework 54, they may be provided at each of their corners with roller guide members 86. The guide members include brackets 88 affixed to the corners of the platen frame 64 and the carriage 74. Each bracket carries spaced pairs of rollers 90 mounted perpendicularly to one another and adapted to rollingly engage track plates 92 affixed to adjacent angularly disposed faces of the associated corner posts 56. The platen frame and carriage are thus held firmly against lateral movement while being able to move freely up and down along a vertical path.

As heretofore explained the lower press member 42 carries a shaping rail 80 which is of outline or ring-type construction and which normally resides in a rest position beneath the rolls 38. A heated sheet S can the be advanced on the rolls into position over the press member so that the sheet can be lifted from the rolls by the lower press member, pressed against the upper shaping element 62, and then returned to the rolls 38 and 44, or otherwise advanced out of the bending station 16 as by the aforementioned shuttle transfer mechanism (not shown).

For purposes of accurately positioning each sheet between the upper and lower press members 40 and 42, there is provided in the path of the advancing sheets between adjacent ones of the rolls 38 and 44 a pair of laterally spaced locator stops 94. Each of the locator stops is affixed to the distal end of a piston rod 96 of a fluid actuated cylinder 98 mounted as on the base plate 78 of the carriage 74. The cylinders are operable to selectively move the stops 94 between an upper raised position at which they protrude above the conveyor rolls 38 into the path of an advancing glass sheet S, and a lowered position beneath the path. The base plate 78 is carried on the bed 76 of the carriage 74 so as to move up and down therewith.

A hydraulic cylinder 100 is suitably mounted beneath the carriage 74 upon the beams 58. The cylinder includes a piston rod 102 connected at its distal end to the bed 76 of the carriage 74. The axially extensible and retractable piston rod is thus operable to reciprocally move the lower female press member 42 between its retracted or lowered and raised positions. In the retracted position the shaping rail 80 is disposed beneath the rolls 38 so that a sheet may advance into position thereabove and into engagement with the locator stops 94. Upon extension of the piston rod the shaping rail 80 moves upwardly through the bed of rolls 38 to lift the heated sheet S from the rolls and press it against the upper press member 40 between the complementary shaping surfaces of the male element 62 and the shaping surface 84 of the shaping rail 80 to form it to a predetermined curvature. Upon completion of bending, the piston rod 102 is retracted to lower the carriage 74, thereby retracting the shaping rail 80 thereon and depositing the bent sheet on the conveyor rolls 38 or other transfer mechanism such as the aforementioned shuttle transfer system for removal from the bending station 16.

As shown diagrammatically in FIG. 1, the programmable system 20 for operating the lower press member 42 includes a suitably driven hydraulic pump 104 adapted to receive hydraulic fluid through a conduit 106 from a reservoir 108. The pump 104 provides hydraulic fluid under pressure through a pressure supply conduit 110 to a servo solenoid valve 112. The servo solenoid valve may be of the type available commercially from the Parker Hannifin Corporation, Hydraulic Valve Division, Elyria, Ohio 44035, under the designation Series D31FH.

The valve 112 controllably regulates flow of hydraulic fluid to and from the press cylinder 100 through conduits 114 and 116 connected the cylinder at the proximal and distal ends, respectively. More particularly, hydraulic fluid is supplied through the conduit 114 to the proximal end of the cylinder beneath the piston (not shown) connected to the piston rod 102 for raising the lower press member 42. At the same time hydraulic fluid is expelled from the cylinder above the piston at the distal end and returned through the conduit 116 to the solenoid valve and thence through a return conduit 118 to the reservoir 108. For retracting the lower press member the servo solenoid valve 112 directs hydraulic fluid through the conduit 116 to the distal end of the press cylinder 100 above the piston, and fluid returns from beneath the piston through the conduit 114 and the solenoid valve to the reservoir 108.

In order to continuously monitor the position and velocity of the lower carriage or platen 74 and send appropriate indicative signals to the control system, a linear displacement transducer, identified generally at 120, is provided. The linear displacement transducer, by way of example, may suitably be a TEMPOSONICS II model, commercially available from MTS Systems Corporation, Box 13218, Research Triangle Park, N.C. 27709. More specifically, the linear displacement transducer comprises a stationary sensing unit 122 carried upon a bracket 124 affixed as to a corner post 56 of the framework 54. A linear probe 126 of the sensing unit is adapted to project axially through a ring magnet 128 affixed to a bracket 130 carried by the carriage 74. Thus, as the carriage or lower platen 74 reciprocates vertically the linear probe 126 correspondingly moves axially back and forth through the magnet 128, generating a signal indicative of the position, direction of movement and velocity of the lower carriage.

The linear displacement transducer is capable of consistently determining the position and velocity of the lower carriage with great accuracy, for example, its position within one thousandth of an inch. The signal from the sensing unit 122 is transmitted by a line 132 to a programmable motion controller 134. The motion controller may suitably be a model designated TMC 188/40, available from Delta Computer Systems, Inc., Industrial Electronics Controls, 11719 NE 95th Street, Suite D, Vancouver, Wash. 98682-2444. The motion controller interfaces through a line 136 with a conventional interface unit 138 including an operator console and programming entry system.

A position module 140 receives velocity command signals from the motion controller 134 through a line 142, and sends appropriate spool position command signals through a line 144 to the servo solenoid valve 112. Feedback signals indicative of the actual servo valve spool position are sent from the valve 112 through a line 145 to the position module 140.

With the closed loop system of the invention the setpoint, that is, the predetermined program for the lower carriage or platen operation, is entered through the operator interface unit 138, and the press unit is ready for operation. A heated sheet S advances into position upon the rolls 38 and the up command is issued by the computer unit 138. The servo-valve is positioned to move the lower carriage or platen 74 upwardly at a predetermined speed commanded by the motion controller 134. The position of the servo solenoid valve 112, which determines the velocity of the platen, is monitored by the computer 134 and this target velocity is compared to the actual velocity of the platen 74 as determined by the linear displacement transducer 120. Adjustments to the position of the servo solenoid valve are made as necessary in response to signals from the motion controller 134 by the position module 140 to insure that the platen moves at the predetermined speed in accordance with the program.

When the upwardly moving platen reaches the slow-down position in its cycle as determined by the linear displacement transducer 120, the motion controller 134 signals the position module 140 to set the servo solenoid valve for reducing the rate of flow of fluid to the cylinder 100, and hence the platen speed, to the predetermined level. The platen speed is continuously monitored and corrected as appropriate by the linear displacement transducer and programmed motion controller. When the platen reaches the upper dwell position, again as determined by the linear motion transducer, its motion is stopped. Due to the degree of precision of the transducer, the platen is consistently able to achieve a dwell position within a high degree of accuracy, on the order of 0.001 inch (0.025 mm), without bottoming of the piston within the cylinder. Upon elapse of a selected dwell time, the motion controller signals the position module to set the servo solenoid valve for retracting the piston rod 102 and moving the platen downwardly at a selected speed. The platen speed and position are monitored by the linear transducer 120, and the platen is stopped precisely at a predetermined lower rest position in response to appropriate signals from the linear motion transducer to await the beginning of the next cycle.

The advantages of the closed loop hydraulic system described above have been found to be particularly advantageous when used in a second embodiment of the invention which involves combining the closed loop hydraulic system for the operation of the upper or lower platen member with increased control and accountability of the movement of the glass sheet S on the aligned conveyor roles 24 forming a part of the variable speed conveyor system 12.

Figure 2:
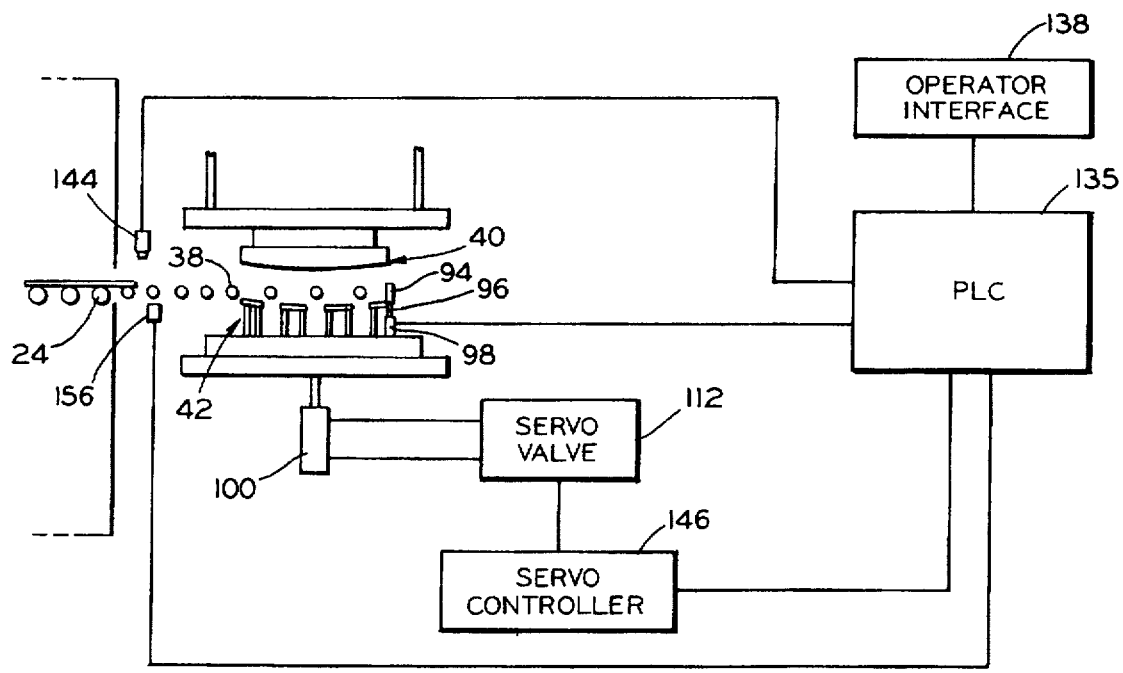
FIG. 2 is a diagrammatic view of FIG. 1 showing additional components which are added in a second embodiment of the invention.

Referring to FIG. 2, a second embodiment of a construction embodying the present invention is shown in diagrammatic form. In this embodiment of the invention the operator interface 138 is connected to programmable logic controller (PLC) 135. It is preferable to use a programmable logic controller due to the additional tasks which need to be performed. As before, the hydraulic cylinder 100 is hydraulically connected to servo valve 112, which is connected to servo controller 146. The stop means 94 are again operated by the PLC 134. In addition a photoelectric eye 144 is connected to the PLC.

A variable speed drive motor (FIG. 3) 148 is connected by way of shaft 150 to at least one of the second conveyor rolls 38. Mounted to the output shaft 150 is an indicator means, such as gear 38A having fine teeth (indicated diagrammatically in FIG. 3). The teeth moving past magnetic pickup 156 produce pulses which are supplied to motor speed controller 158, which may be such as the "M-Trim" manufactured by Fenner Industrial Controls of Maple Grove, Minn. The motor controller 158 is then connected to motor drive 159. The motor drive 159 is, in turn, connected to motor 148 to form a control loop.

The gear 38A has a predetermined number of teeth on it, and the magnetic pickup 156 produces a pulse each time one of the gear teeth passes by the pickup. Since the spacing of the gear teeth is precisely known, the number of teeth can be related to angular position, and the rate at which they are counted can be related to the angular velocity or speed of the second conveyor rolls 38. With this information, the motor speed controller 158, in combination with the PLC 135, can control the speed of the conveyor rolls 38 very precisely.

The pulse from the magnetic pickup 156, in addition to being supplied to the motor speed controller 158, is supplied to counting means including a counter card (not shown) in the PLC 135 for purposes to be described hereinafter. Likewise the PLC 135 can supply signals to the motor speed controller 158.

Alternately, other variable speed drive means, such as a servo drive control, could be used to drive the conveyor rolls.

In this embodiment of the invention, the servo solenoid valve 112 is a zero overlap valve, which may be such as the Bosch Racine servo solenoid valve model number NG-6 manufactured by the Bosch Racine Group of Racine, Wis. The use of the zero overlap valve is preferred in the second embodiment of the invention because the pulsating effect which is produced by other valves is eliminated. However, other servo solenoid valves, including that previously described, could be used, if desired. The servo controller 146 may be the same as the programmable motion controller 134 if desired.

Figure 4:
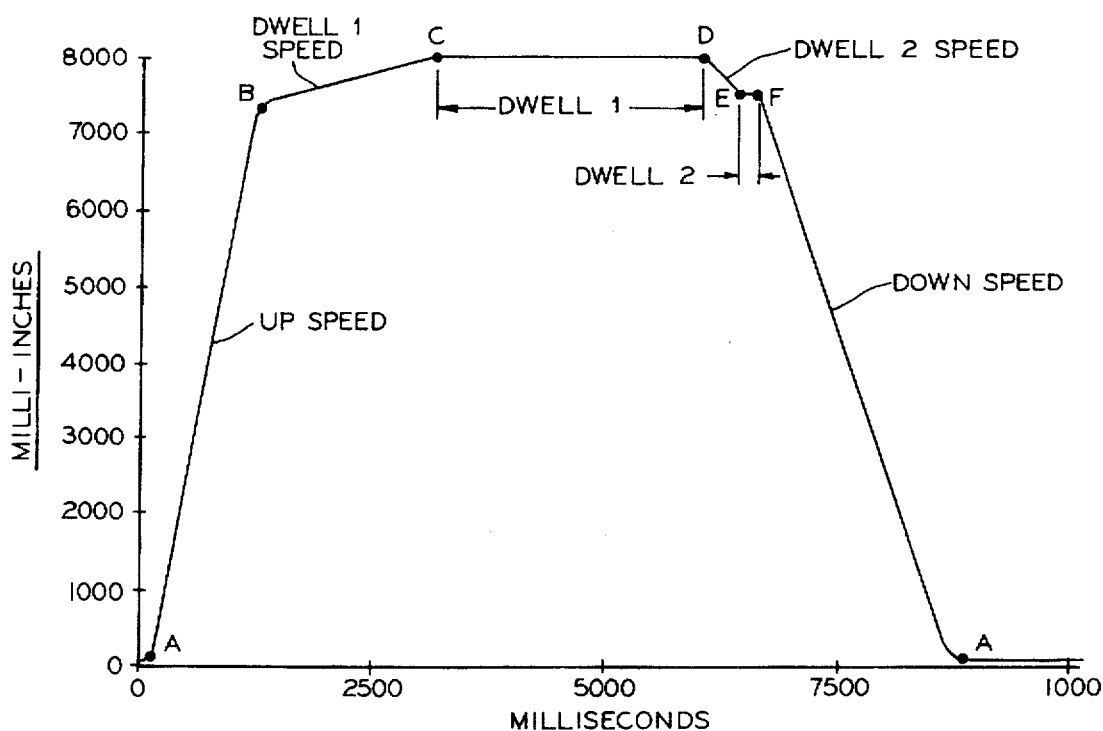
FIG. 4 is a graph showing a plot of a press cycle performed in accordance with the method of the present invention.

Referring now to FIG. 4, there is shown a graph of one of the almost infinite number of cycles of the platen or lower press member 42 which may be preprogrammed into the PLC 135 through the operator interface 138. The particular cycle shown is for bending windshield, and is a plot of milliseconds of time versus milliinches of position of the lower press member 42. The operator will have entered into the PLC 134, through the operator interface 138, the "wait" positions or first predetermined position (A), the CAM or slow down or second predetermined position (B), the Dwell 1 or third predetermined position (C,D) a Dwell 2 or fourth predetermined position (E,F). The operator will have also entered through operator interface 138 a first predetermined, or up, speed or velocity, a second predetermined, or CAM speed, or Dwell 1 speed or velocity, a third predetermined, or Dwell 2 speed or velocity, and a fourth predetermined down speed or velocity. Also for purposes to be described, a first number of pulses, or "operator preset 1", and a second number, or "operator preset 2" will be entered.

It should be understood by those skilled in the art that this press cycle, which is by way of example for press bending a windshield, is only one of an almost infinite variety of cycles which may be preprogrammed by the operator. Additional positions or velocities may be programmed as desired. For example, when certain types of parts are bent, the platen or lower press member may be lowered to a below home or "wait" position, while a shuttle removes the windshield from under the upper press member after bending. When some shuttles are in use, the lower press member does not have to go to a below home position. When parts other than windshields are being bent, a Dwell 2 position and Dwell 2 speed may not be used. Thus it can be understood by those skilled in the art that this programming capability makes for a construction of extreme versatility in the glass bending art.

Figure 5:
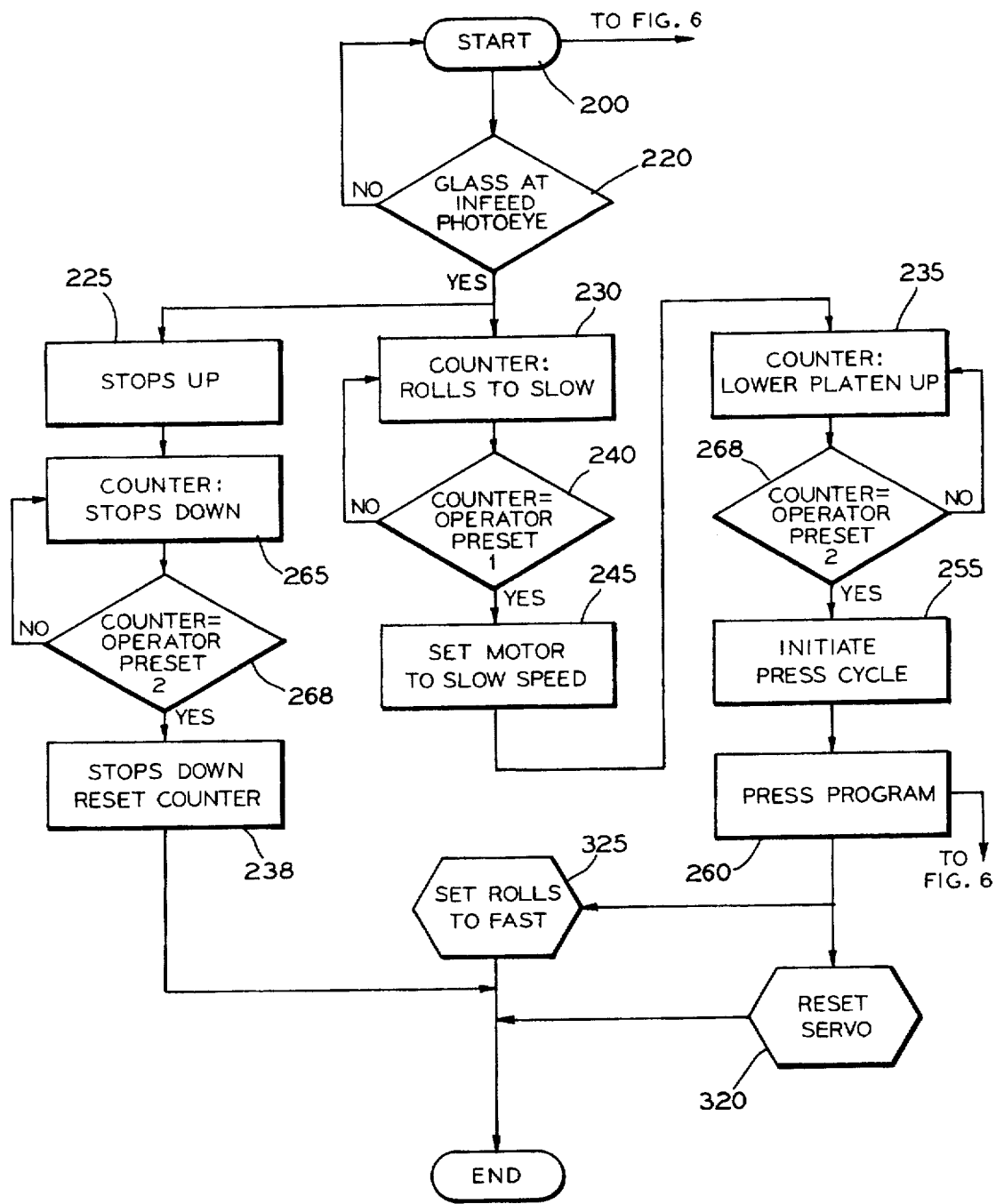
FIG. 5 is a flow chart showing a series of steps used in the method of the present invention.
Figure 6:
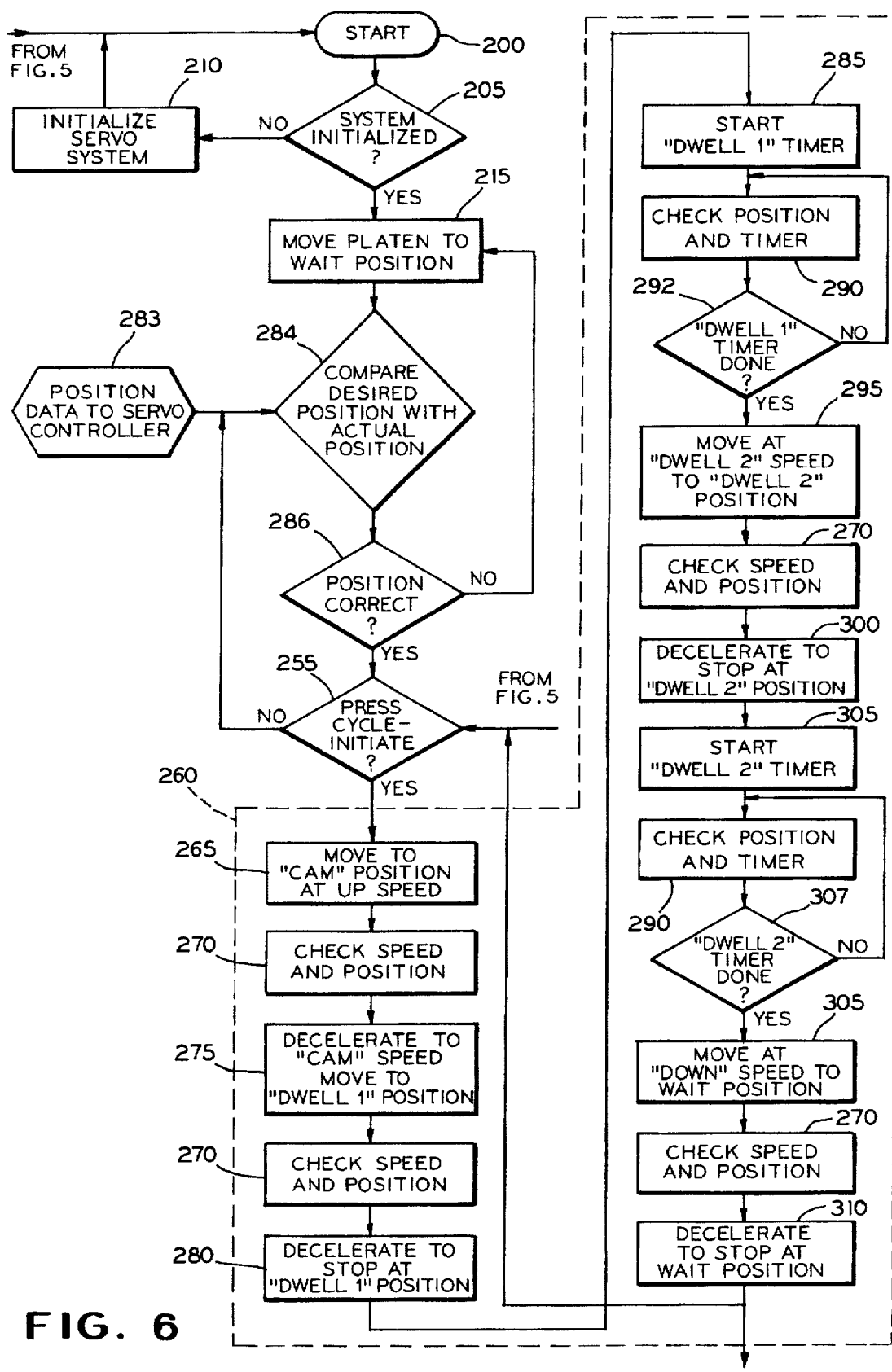
FIG. 6 is a flow chart showing additional steps used in the method of the present invention.

Referring now to FIGS. 5–6 the operation of the present method and apparatus will be explained in greater detail. When the press cycle is started (box 200) several things happen substantially simultaneously. The computer will check to see if the system is initialized (box 205). If the system is not initialized, the servo system will be initialized (box 210), and the lower platen or press member 42 will be moved to the first predetermined or "wait" position (box 215).

While this is happening, the computer will be checking (box 220) to see if a sheet S of glass has been detected by the photoelectric eye 144 while travelling along the conveyor rolls 38 at a first predetermined speed. When the photo eye 144 detects a sheet S of glass, it will send a signal to the PLC 135. The PLC will then cause the stops 94 to be raised (box 225) and the counter card (not shown) in the PLC 135 to begin counting pulses from the magnetic pickup 156.

Figure 3:
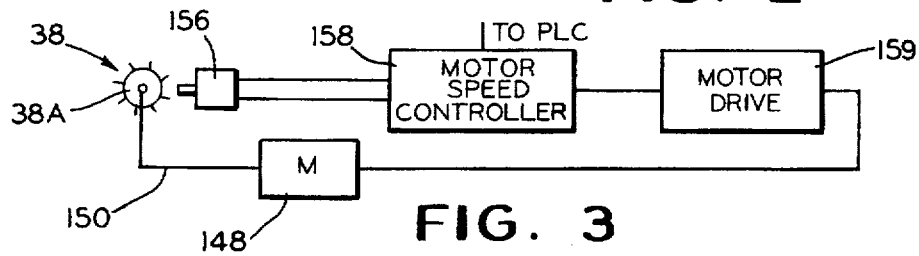
FIG. 3 is a more detailed diagrammatic view of the magnetic pickup shown in FIG. 2 and the associated apparatus for controlling the speed of the conveyor rolls.

As previously explained with regard to FIG. 3, the magnetic pickup 156 counts a pulse every time one of the teeth on gear 38a passes in proximity thereto. These pulses are supplied to the motor speed controller 158 as well as being supplied to the counter card in the PLC 135. As shown in FIG. 5, a decision is being made (box 230) as to whether to change the speed of the second conveyor rolls 38 from the first predetermined speed to the second determined speed or "creep" speed. The counter card is continuously comparing the number of counts counted to the "operator preset 1" value. The second conveyor rolls 38 will continue to rotate at the speed of the conveyor rolls 24 until the "operator preset 1" value is reached (box 240). At this time (box 245) the PLC 135 supplies a signal to the primary/secondary mode switch of the motor speed controller 158. The controller will automatically start to decelerate the rolls in accordance with the program the operator has entered into the motor speed controller 158. This is accomplished through the motor drive 159 supplying a signal to the motor 148, which turns the shaft 150 connected to the second conveyor roll or rollers 38.

While this deceleration is taking place, the motor speed controller is operating independently of the PLC 135, but pulses are still being supplied to the counter card by the magnetic pickup 156. The computer is continuously checking (box 235, 268) to see if the "operator preset 2" value for counter pulses has been reached. When the "operator preset 2" value is reached, the press cycle will be initiated (box 255). It is up to the judgment of the operator to choose the "operator preset 2" value such that the "creep" speed is just being reached, and the glass sheet is just coming into registry between the upper and lower platen member, when the press cycle is initiated. This requires some judgement on the part of the operator.

When the counter card has the required number of counts it initiates the press cycle (box 255) which starts the press program (260). At the same time the press cycle is initiated, the stops 94 will be lowered (box 265) and the counter will be reset (box 238). The press program is described in greater detail in FIG. 6.

As previously described, at the initiation of the cycle (box 200) the system was initialized (box 205) and the platen was moved to the "wait" position (box 215) by the hydraulic cylinder 100. The closed loop control system previously described has been continuously comparing the desired "wait" position with the actual "wait" position (box 284) utilizing information being supplied to the servo controller 146 by the linear transducer 122 (box 283). The servo controller 146 continually inquires if the position is correct (box 286), and will initiate the press cycle (box 260) if both the position is correct and a proper signal is received indicating that the number of pulses counted by the counter card in the PLC 135 is equal to the "operator preset 2" value. If the position is not correct, the system will loop through boxes 215, 284, 286 until the platen is in the correct position.

In accordance with the values preprogrammed by the operator into the operator interface 138 to accomplish the program shown in FIG. 4, lower press member 42 will be rapidly advanced by the hydraulic cylinder 100 under control of the servo valve 112 and servo controller 146 at the up or first predetermined velocity until it reaches the first predetermined slow down or CAM position indicated at point B on FIG. 3. While the lower press member 42 is moving to the CAM position at up speed, the closed loop hydraulic control system is continually checking the speed and position of the platen.

Figure 7:
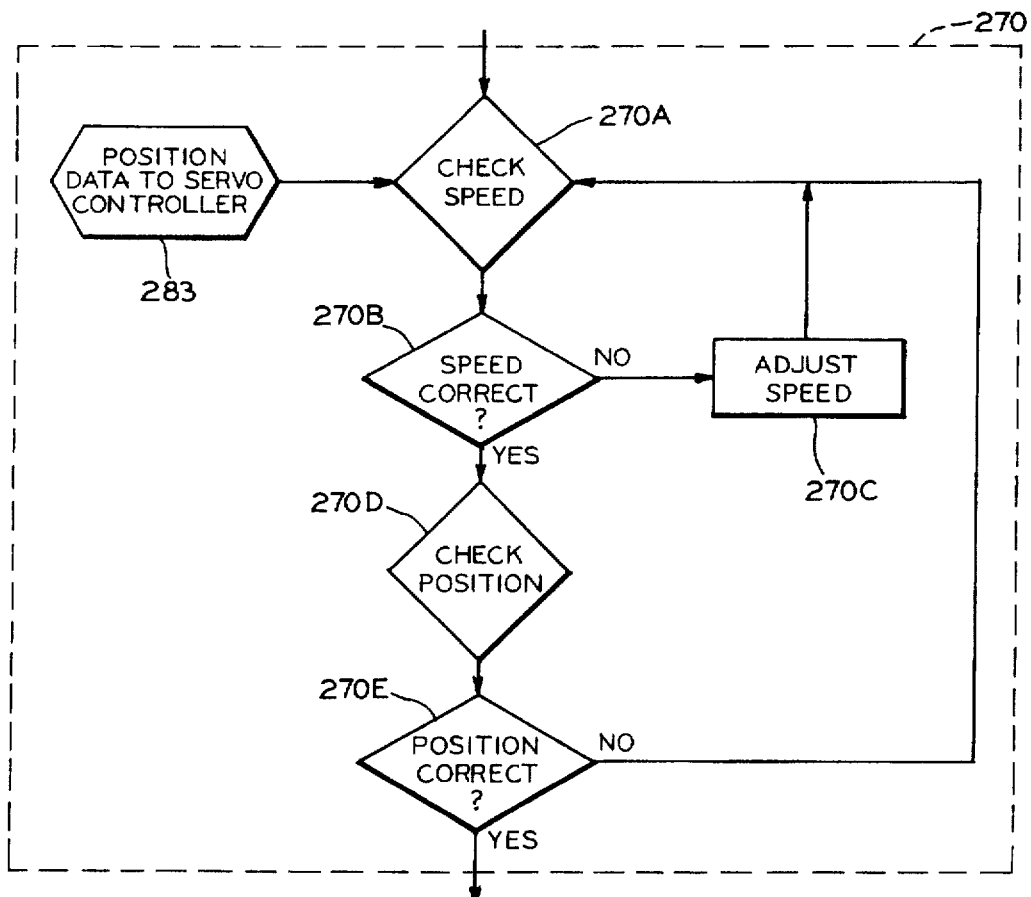
FIG. 7 is a flow chart showing a series of steps involved in the step of checking the speed and position of the lower platen member shown in FIG. 6.

The servo controller 146 continually inquires: "Is the speed correct?" by monitoring the position data being supplied to the servo controller 146 by the measuring device associated with the servo solenoid valve 112. If the speed is not correct, an adjustment will be made and the inquiry repeated. As shown in FIG. 7, the system will make the loop of checking speed (box 270A), inquiring if the speed is correct (box 270B), adjusting speed if the speed is not correct (box 270c) until the inquiry can be answered yes, at which time the servo controller 146 will make a check of position (box 270D) by inquiring: "Is the position correct?" (270E). If the position is not correct, the system loops to Box 270A where the speed will again be checked.

This will continue to occur until the speed and position check indicate that the lower press member 42 has arrived at position B. At this time (box 280) the servo controller 146 will begin decelerating the lower press member 42 at the so called CAM speed, second predetermined velocity or "Dwell 1" velocity (box 275). The same speed and position check (box 270) are again made while this is occurring until it is determined that the lower press member 42 has decelerated to a stop and is at the "Dwell 1" (C) position.

At this time a dwell timer (not shown) will be started (box 285). The servo controller 146 will continue to check on the position of the lower press member 42, while the PLC 135 is checking the time remaining on the dwell timer. This will continue throughout the period of time which the operator has programmed as the "Dwell 1" time through the operator interface 138. This operation, to be described in more detail hereinafter, is identified as Box 290.

Once the dwell timer has timed out, (box 292) the press member 42 will move at a predetermined "Dwell 2" velocity to the "Dwell 2" position or "E" position (Box 295) while the speed and position of the lower platen is checked (Box 270). At the conclusion of this portion of the cycle, the lower platen 42 will have decelerated to a stop at the "Dwell 2" position (box 300).

The "Dwell 2" timer (not shown) is started (box 305) and the position of the lower platen member and the time remaining on the timer, is again continually checked (box 290) until the "Dwell 2" timer times out, at which time the lower platen will move at the down speed or velocity toward the "wait" position (box 305, 307). Again, its' speed and position is constantly being checked (box 270) until it reaches the "wait position" (box 310). At this time a signal will be supplied, as shown at Box 255, indicating that one press cycle has been completed and another is ready to be initiated.

Figure 8:
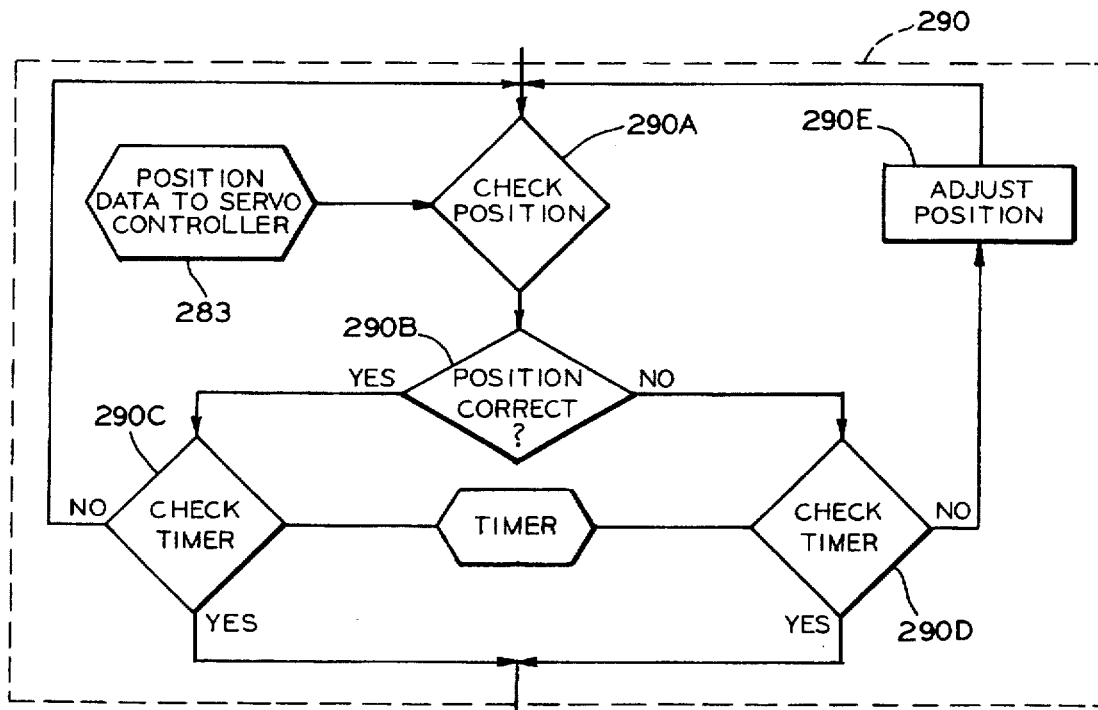
FIG. 8 is a flow chart showing a series of steps involved in the step of checking position and timer value shown in FIG. 6.

The manner in which the "check position" operation (box 290) is carried out is shown in FIG. 8. It is desirable that the lower press member 42 remain in the correct position and not "creep" while the dwell is being held, as this will effect the quality of the glass product being manufactured. For this reason, while the "Dwell 1" or "Dwell 2" timer is timing out, the system will be continually looping. The position will be checked (box 290A) by inquiring: "Is the position correct?" (box 290B).

If the position is correct (box 290B) the timer will then be checked (box 290C). If the timer has not timed out, the program will continue to loop through (box 290A), 290B and 290C) until the timer has timed out and the program moves to the next step. If at any time the position has not been found to be correct the program will then again check the timer (box 290D) and, as long as the timer has not timed out, will adjust the position (290E) and then recheck the position (box 290A). If the position is still not correct (box 290B) the timer will again be checked (box 290D), and if there is time remaining, the position will again be adjusted (box 290E). This loop through boxes 290A, 290B, 290D, and 290E will continue as long as the timer has not timed out and the position is incorrect. Once the position is corrected, the program will use the loop (290A, 290B and 290C) previously described. It is to be noted that the timer is dominant, and the program will continue to run even if the exact predetermined desired position has not been reached by the time the Dwell timer has timed out.

When the press program (box 260) is completed, a signal will be sent to reset the servo valve (box 320) and to reset the second conveyor rolls 38 to the fast speed to be in a readiness state to receive the next sheet S of glass from the first set of conveyor rolls 24 (box 325).

It is to be understood that the form of the invention herewith shown and described is to be taken as an illustrative embodiment only of the preferred mode of the invention, and that various changes in the shape, size and arrangement of parts, as well as various procedural changes, may be resorted to without departing from the spirit of the invention.

What is claimed is:

1. A method of operating a glass sheet press bender located outside a glass furnace of the type having opposed first and second press members mounted for reciprocating relative motion toward and away from each other, variable speed conveyor means including rotatable, bodily stationary, rollers for propelling a glass sheet to be bent to, between, and away from said opposed first and second press members, sensing means to detect the presence of a glass sheet on said variable speed conveyor means, control means to vary the speed of said conveyor, sensing means to sense the speed of said conveyor, closed loop hydraulic control means to control the position of an actuator, and an actuator affixed to the first press member and connected to said control means for selectively advancing said first press member toward and retracting it away from said second press member, the first and second press members having opposed complemental shaping members for imparting a desired curvature to a heated sheet pressed therebetween, said method including the steps of:

a) operating said conveyor means at a first, predetermined desired speed, b) conveying a sheet of glass on said conveyor means toward said first press member at said first predetermined desired speed, c) sensing, with said sensing means, when said glass sheet reaches an in-feed position, d) utilizing said control means to decelerate said conveyor means to a second, predetermined, desired speed while conveying said glass sheet to a position between said first and said second press members, e) utilizing said closed loop hydraulic control means to control said actuator in relationship to said conveyor means reaching said second predetermined speed to advance and retract the first press member along a path in accordance with said predetermined program, wherein said first press member advances from a position below the top surface of said conveyor means to a position to first contact, and then lift said glass sheet from said conveyor means into contact with said second press member for bending.

2. The method defined in claim 1, and including the further steps of:

a) continuously monitoring the position and velocity of the first press member along the path and generating first signals indicative of the actual position and velocity of said first press member, b) comparing the observed actual position and velocity with a predetermined position and velocity, and generating second signals indicative of the variations between the actual position and velocity and the predetermined position and velocity, c) regulating the actuator in response to the signals indicative of the variations to cause said first press member to advance and retract along the path in accordance with the predetermined program to bend said glass sheet.

3. The method defined in claim 2, wherein the step of sensing, with said sensing means, when said glass sheet reaches an infeed position, includes the step of detecting the presence of a glass sheet on said variable speed conveyor means using a photoelectric eye.

4. A method of operating a glass sheet press bender located outside a glass furnace of the type having opposed first and second press members mounted for reciprocating relative movement toward and away from each other, variable speed conveyor means including powered, bodily stationary rollers for propelling a glass sheet to be bent to, between, and away from said opposed first and second press members, sensing means to detect the presence of a glass sheet on said variable conveyor means, stop means which may be raised or lowered as desired to stop the progress of a glass sheet on said variable speed conveyor means, control means to vary the speed of said conveyor means, counter means to sense the speed of said conveyor, closed loop hydraulic control means to control the position of an actuator, and an actuator affixed to the first press member and connected to said closed loop control means, for selectively advancing said first press member toward and retracting it away from said second press member, the first and second press members having opposed complemental shaping members for imparting a desired curvature to a heated sheet of glass pressed therebetween, said method including the steps of:

a) operating said conveyor means at a first predetermined desired speed;

b) conveying a sheet of glass on said variable speed conveyor means towards said press member at said first predetermined desired speed;

c) utilizing said sensing means to determine that a glass sheet has reached an in-feed position;

d) raising said stop means;

e) starting said counter means;

f) determining if the value of the counts on said counter means is equal to a first operator preset value and if said number of counts on said counter means is equal to said first operator preset value utilizing said control means to decelerate said conveyor means to a second predetermined desired speed while conveying said glass sheet to a position between said first and said second press members;

g) continuing to count pulses and comparing the count of pulses with an operator second pre-set value; and h) determining that the number of pulses counted is equal to the second operator pre-set value and lowering said stop means while utilizing said control means to operate said actuator to advance and retract the first press member along the path in accordance with a predetermined program.

5. The method defined in claim 3, and including the further steps of resetting said variable speed conveyor means to the first predetermined speed and resetting said actuator after said predetermined program is complete.

6. The method defined in claim 4, wherein the step of running said predetermined program includes the step of:

a) determining that said system is initialized, b) moving said lower press member to a "wait" position, c) continuously checking that said lower press member is at the correct predetermined desired "wait" position.

7. The method defined in claim 5, and including the further steps of:

a) receiving a signal from said counting means to initiate said predetermined program;

b) moving said lower press member from said "wait" position to a first predetermined position while continuously checking the speed and position of said lower press member;

c) moving said lower press member from said first predetermined position to a second predetermined position while continuously checking the speed and position of the lower press member;

d) starting a dwell timer and maintaining said lower press member at said second predetermined position until said dwell timer has timed out;

e) moving said lower press member to a third predetermined desired position while continuously checking the speed and position of said lower press member;

f) starting a dwell timer and continuously checking the position of the lower press member and the time remaining on said timer until said dwell timer has been timed out; and g) lowering said lower press member to said "wait" position while continuously checking the speed and position of the lower press member.

8. The method defined in claim 6, wherein the step of continually checking and correcting the speed and position of the first press member include the steps of:

a) checking the speed of said press member to determine if said speed is equal to a predetermined desired speed;

b) correcting said speed if necessary;

c) checking if the actual position of said lower press member is at a predetermined desired position.

9. Apparatus for press bending heated glass sheets outside a glass furnace to a predetermined configuration comprising a framework, a reciprocable press member mounted within said framework and having a first shaping member conforming in curvature to the configuration to be imparted to the glass sheets, a second shaping member mounted within said framework opposite the first shaping member and having a configuration complementary to the first shaping member, conveyor means, at least a portion of which are of a variable speed nature, for advancing a heated sheet from an adjacent furnace into press bending position between the first and second shaping members, sensing means for determining the presence of a glass sheet on said conveyor means, control means for controlling the speed of said at least variable speed portion of said conveyor means, a hydraulic actuator for reciprocating said reciprocable press member, closed loop hydraulic control means operably coupled to said hydraulic actuator means, said closed loop hydraulic control means being adapted to operate said actuator means for cycling the reciprocable press member in accordance with a predetermined program, a linear displacement transducer associated with said reciprocable press member for generating signals indicative of the actual position and velocity of said reciprocable press member, and means for transmitting the signals from the linear displacement transducer to said closed loop motion control means.

10. The apparatus defined in claim 9, wherein said motion control means include a programmable logic controller, and including operator interface means for inputting data to said programmable logic controller.

11. The apparatus defined in claim 10, wherein said linear displacement transducer comprises a stationary unit carried by said framework and a cooperating movable section carried by said reciprocable press member.

12. The apparatus defined in claim 11, wherein said hydraulic actuator means comprises a hydraulic cylinder carried by said framework and includes an axially extensible and retractable piston rod connected to said reciprocable press member.

13. The apparatus defined in claim 12, and including a pump for supplying hydraulic fluid under pressure to said cylinder, a servo valve through which hydraulic fluid flows to and from said cylinder for selectively controlling extension and retraction of said piston rod.

14. The apparatus defined in claim 13, including a servo controller connected to said servo valve for selectively adjusting said servo valve, and a servo controller connected to said servo valve and said programmable logic controller for adjusting said servo valve in response to signals from said programmable logic controller.

15. The apparatus defined in claim 13, wherein said sensing means include a photoelectric eye connected to said programmable logic controller.

16. The apparatus defined in claim 14, wherein said control means to control the speed of said at least a portion of said conveyor means includes:

a) a pulse producing means mounted for rotation to said conveyor means to produce a pulse indicative of the speed of rotation of said conveyor rolls;

b) counter means including a magnetic pickup mounted in operating proximity to said pulse producing means to count said pulses;

c) a motor speed controller connected to said magnetic pickup and to said programmable logic control;

d) a motor drive connected to said motor speed controller; and e) a motor drivingly connected to said conveyor means and electrically connected to said motor drive.

17. The apparatus defined in claim 16, and further including a retractable stop means operable to block the passage of a glass sheet along said conveyor means, said stop means connected to said programmable logic controller.

18. The apparatus defined in claim 17, wherein said means for counting the magnetic pulses produced by said magnetic pickup include means to compare said number of pulses to predetermined desired values, and means to indicate when said predetermined desired values are met, said programmable logic controller controlling said actuator and said conveyor means in response to said signals from said counter means.

19. The apparatus defined in claim 18, wherein said motor speed controller is capable of automatic deceleration between a first predetermined desired speed and a second predetermined desired speed upon the receipt of a signal from said programmable logic controller.

20. The apparatus defined in claim 19, wherein said pulse producing means includes a gear mounted to the shaft of said motor.

21. The apparatus defined in claim 20, wherein said conveyor means include a first series of conveyor rolls for conveying glass sheet through a heating chamber in a furnace, a second series of conveyor rolls for movement into and within the bending station, and a further series of rolls for carrying the glass sheets out of said bending station, said second series of rolls being the rolls capable of having their speed varied by said control means.

* * * * *

UNITED STATES PATENT AND TRADEMARK OFFICE
CERTIFICATE OF CORRECTION

PATENT NO. : 5,716,425
DATED : February 10, 1998
INVENTOR(S) : Jennifer R. Wolfe et al.

It is certified that error appears in the above-identified patent and that said Letters Patent is hereby corrected as shown below:

COLUMN 4, LINE 46 CHANGE "sheets'" TO --sheets S--.

COLUMN 4, LINE 61 AFTER "station 18." ADD --The conveyor rolls 24, 38 and 44 are all rotatable, bodily stationary, rollers. Rotatable, bodily stationary, rollers are rollers which rotate about a fixed axis, as opposed to rollers which may rotate about an axis which periodically laterally shifts. Such rollers may be powered or unpowered, and may be of a one piece, or multiple piece construction, such as a mandrel and rotating sleeve-type roller.--.

COLUMN 5, LINE 7 CHANGE "parallel piped" TO --parallelpiped--.

COLUMN 10, LINE 1 CHANGE "38a" TO --38A--.

Column 14, line 1: CHANGE "step" TO --steps--.

Column 16, line 2: CHANGE "control" TO --controller--.

Signed and Sealed this

Seventeenth Day of August, 1999

Attest:

Q. TODD DICKINSON

*Attesting Officer*    *Acting Commissioner of Patents and Trademarks*